UNITED STATES PATENT OFFICE.

PETER SWEENEY, OF NEW YORK, N. Y., AND ALBERT BEACH, JR., OF NEWARK, ASSIGNORS TO ALBERT BEACH, OF NEWARK, N. J.

IMPROVEMENT IN THE MANUFACTURE OF VEGETABLE FELT.

Specification forming part of Letters Patent No. 159,051, dated January 26, 1875; application filed June 22, 1874.

*To all whom it may concern:*

Be it known that we, PETER SWEENEY, of the city, county, and State of New York, and ALBERT BEACH, Jr., of Newark, in the county of Essex and State of New Jersey, have made an invention of a new and useful manufacture, which we denominate Vegetable Felt; and that the following is a full, clear, and exact description and specification of the same.

Our invention is a light, spongy sheet, composed of the downy seed matter of the plant pulu, (*Typha catifolia*,) combined together by means of vegetable fiber, by preference that made by pulping jute.

This article of manufacture is a bad conductor of heat, and is light, spongy, and elastic. Hence it may be used for a variety of purposes, such, for example, as the sheathing of houses, the deafening of floors, and bedding, while it is free from the deleterious peculiarities which characterize felt made from animal hair or fur.

In order that our invention may be fully understood, we will proceed to describe the mode in which we have manufactured it with success.

We operate upon jute in the same manner as is practiced for the manufacture of paper, and reduce it (by the pulping-engine) to the condition of what is known in paper-making as "half-stuff."

We take the seed-spikes of the pulu and subject them to the action of a devil or picker, so as to break and disintegrate them. The pulu thus disintegrated (but not reduced to pulp) is thrown into a vat containing the jute half-stuff mixed with water in the condition in which it is taken from the pulping-engine.

The mixture of the dry disintegrated pulu with the wet jute half-stuff is effected by thoroughly agitating the mass by means of stirrers.

The mass thus mixed is formed into sheets, either by hand or by machinery. In the former case we use a wooden frame, across the bottom of which wire-gauze is strained. We dip this frame into the vat of the mixture, and operate in the same manner as in making paper by hand. When the frame is raised out of the vat the water runs through the gauze and leaves the article deposited in the condition of a wet sheet, which is dried by exposure to air.

When we operate by machinery we use a Foudrinier paper-machine, and supply the wire-gauze belt with the wet mixture in sufficient quantities to produce the sheet of the desired thickness.

After the sheet of material is dry we prefer to coat one or both its surfaces with a coating of some glutinous, gelatinous, or resinous material. A good material for this purpose is that which is used for coating glazed cotton batting, and this material is applied to the surface by means of a brush, and is permitted to dry.

Fish-glue dissolved in water may be used for the same purpose, and also linseed-oil varnish.

We sometimes apply a sheet of thin paper to the article after its surface has been coated with a glutinous composition, and before the latter has dried, and we then press the paper to the article, so that the paper is caused to form the surface of the sheet.

The article may be dyed, or its surface may be printed, if desired.

The long-fiber pulp of other substances than jute may be used for combining the seed material of the pulu, and, if deemed best, other substances may be incorporated in the article in the process of manufacturing it.

The relative quantities of pulu and jute which we have used with success are one part by weight of the dry pulu-seed spikes to two parts by weight of dry jute. As, however, the pulu, when disintegrated, is exceedingly light and flocculent, its bulk in these proportions, relatively to the jute-pulp, is much the larger of the two, and it constitutes the greater part by bulk of the finished article. We do not, however, restrict our invention to the relative proportions in which the materials are combined, as these may be greatly varied as circumstances render expedient.

We claim as our invention—

The vegetable felt, substantially as before set forth, consisting of the downy seed-matter of pulu, combined in a sheet by means of vegetable fiber, the same being a new manufacture.

Witness our hands this 19th day of June, A. D. 1874.

PETER SWEENEY.
ALBERT BEACH, JR.

Witnesses:
W. L. BENNEM,
W. H. ISAACS.